US012141483B2

(12) United States Patent
Yu et al.

(10) Patent No.: US 12,141,483 B2
(45) Date of Patent: Nov. 12, 2024

(54) CONTROL METHOD FOR FORMING AN IMAGE, IMAGE-FORMING DEVICE, AND STORAGE MEDIUM

(71) Applicant: Zhuhai Pantum Electronics Co., Ltd., Zhuhai (CN)

(72) Inventors: Chengzhu Yu, Zhuhai (CN); Lina Meng, Zhuhai (CN); Dan Ning, Zhuhai (CN)

(73) Assignee: ZHUHAI PANTUM ELECTRONICS CO., LTD., Zhuhai (CN)

( * ) Notice: Subject to any disclaimer, the term of this patent is extended or adjusted under 35 U.S.C. 154(b) by 0 days.

(21) Appl. No.: 18/193,155

(22) Filed: Mar. 30, 2023

(65) Prior Publication Data

US 2023/0315349 A1 Oct. 5, 2023

(30) Foreign Application Priority Data

Mar. 30, 2022 (CN) ......................... 202210331815.2

(51) Int. Cl.
*G06F 15/00* (2006.01)
*G06F 3/12* (2006.01)

(52) U.S. Cl.
CPC .......... *G06F 3/1204* (2013.01); *G06F 3/1229* (2013.01)

(58) Field of Classification Search
None
See application file for complete search history.

(56) References Cited

U.S. PATENT DOCUMENTS 6,190,116 B1 2/2001 Asada
8,919,768 B2 * 12/2014 Mo ........................ B65H 29/68 399/404
2004/0084827 A1 5/2004 Takamura
2006/0120782 A1 6/2006 Nakamura et al.
2009/0268244 A1 10/2009 Ataka
(Continued)

FOREIGN PATENT DOCUMENTS

EP 1149792 A2 10/2001
EP 1149792 A3 8/2003
(Continued)

*Primary Examiner* — Mark R Milia
(74) *Attorney, Agent, or Firm* — ANOVA LAW GROUP PLLC

(57) ABSTRACT

A control method for forming an image includes receiving a pending image-forming job, and obtaining pending image-forming data and image-forming configuration information in the pending image-forming job, the image-forming configuration information including total page number corresponding to the pending image-forming job; performing image-forming operation on an image-forming medium according to the pending image-forming data and the image-forming configuration information; under satisfied predetermined conditions, controlling a discharge distance of at least one page of the image-forming medium of the pending image-forming data to be different from a discharge distance of other pages of the image-forming medium, or controlling a discharge distance of at least one page of the image-forming medium of the pending image-forming job to be different from a discharge distance of the image-forming medium of a previous image-forming job.

11 Claims, 13 Drawing Sheets

(56) References Cited

U.S. PATENT DOCUMENTS

| | | | | |
|---|---|---|---|---|
| 2009/0304409 | A1 | 12/2009 | Matoba | |
| 2011/0242577 | A1 | 10/2011 | Pinney et al. | |
| 2011/0261409 | A1 | 10/2011 | Mo | |
| 2019/0373123 | A1 * | 12/2019 | Kokomoto | G06K 15/403 |
| 2020/0180891 | A1 | 6/2020 | Mizutani | |

FOREIGN PATENT DOCUMENTS

| | | | |
|---|---|---|---|
| EP | 1662333 | A2 | 5/2006 |
| EP | 1662333 | A3 | 5/2006 |
| JP | H04191242 | A | 7/1992 |
| JP | H11349208 | A | 12/1999 |
| RU | 2171769 | C1 | 8/2001 |
| WO | 2010053477 | A1 | 5/2010 |

* cited by examiner

CONTROL METHOD FOR FORMING AN IMAGE, IMAGE-FORMING DEVICE, AND STORAGE MEDIUM

CROSS-REFERENCE TO RELATED APPLICATION

This application is a continuation of International Application No. 202210331815.2, filed Mar. 30, 2022, the entire content of which is incorporated herein by reference.

TECHNICAL FIELD

The present disclosure relates to the technical field of image forming and, more particularly, to a control method for forming an image, an image forming apparatus, a device, and a storage medium.

BACKGROUND

In existing technologies, an image-forming device may be shared by multiple users, and may receive multiple consecutive image-forming jobs sent by one or more users to perform an image-forming operation. Generally, during an image-forming process, the image-forming device will continuously output multiple sheets of paper to complete image-forming. Therefore, paper for multiple image-forming jobs from one user, or paper for image-forming jobs from multiple users will be stored in a paper discharge tray in a mixed manner. Therefore, when the user subsequently separates the paper for different image-forming jobs, the paper can only be retrieved and separated by human eyes, which is cumbersome and inefficient.

SUMMARY

In accordance with the disclosure, there is provided a control method for forming an image. The method includes receiving a pending image-forming job, and obtaining pending image-forming data and image-forming configuration information in the pending image-forming job, the image-forming configuration information including total page number corresponding to the pending image-forming job; performing image-forming operation on an image-forming medium according to the pending image-forming data and the image-forming configuration information; under satisfied predetermined conditions, controlling a discharge distance of at least one page of the image-forming medium of the pending image-forming data to be different from a discharge distance of other pages of the image-forming medium, or controlling a discharge distance of at least one page of the image-forming medium of the pending image-forming job to be different from a discharge distance of the image-forming medium of a previous image-forming job.

Also in accordance with the disclosure, there is provided an image-forming apparatus including a data reception unit, an image-forming unit, and a medium discharge unit. The data reception unit is configured to receive a pending image-forming job, and obtain pending image-forming data and image-forming configuration information in the pending image-forming job, the image-forming configuration information including total page number corresponding to the pending image-forming job. The image-forming unit is configured to perform image-forming operation on an image-forming medium according to the pending image-forming data and the image-forming configuration information. The medium discharge unit is configured to, under satisfied predetermined conditions, control a discharge distance of at least one page of the image-forming medium of the pending image-forming data to be different from a discharge distance of other pages of the image-forming medium, or control a discharge distance of at least one page of the image-forming medium of the pending image-forming job to be different from a discharge distance of the image-forming medium of a previous image-forming job.

Also in accordance with the disclosure, there is provided an image-forming device. The image-forming device includes a memory containing a computer program for performing a control method for forming an image; and a processor coupled to the memory and, when the computer program is being executed, configured to: receive a pending image-forming job, and obtain pending image-forming data and image-forming configuration information in the pending image-forming job, the image-forming configuration information including total page number corresponding to the pending image-forming job; perform image-forming operation on an image-forming medium according to the pending image-forming data and the image-forming configuration information; and under satisfied predetermined conditions, controlling a discharge distance of at least one page of the image-forming medium of the pending image-forming data to be different from a discharge distance of other pages of the image-forming medium, or control a discharge distance of at least one page of the image-forming medium of the pending image-forming job to be different from a discharge distance of the image-forming medium of a previous image-forming job.

Also in accordance with the disclosure, there is provided a non-transitory computer readable storage medium including a stored program that, when being executed, controls a device installed with the storage medium to perform a control method for forming an image. The control method for forming an image includes receiving a pending image-forming job, and obtaining pending image-forming data and image-forming configuration information in the pending image-forming job, the image-forming configuration information including total page number corresponding to the pending image-forming job; performing image-forming operation on an image-forming medium according to the pending image-forming data and the image-forming configuration information; under satisfied predetermined conditions, controlling a discharge distance of at least one page of the image-forming medium of the pending image-forming data to be different from a discharge distance of other pages of the image-forming medium, or controlling a discharge distance of at least one page of the image-forming medium of the pending image-forming job to be different from a discharge distance of the image-forming medium of a previous image-forming job.

BRIEF DESCRIPTION OF THE DRAWINGS

In order to explain the technical solutions in the embodiments of the present disclosure more clearly, reference is made to the accompanying drawings, which are used in the description of the embodiments. Obviously, the drawings in the following description are only some embodiments of the present disclosure, and other drawings can be obtained from these drawings without any inventive effort for those of ordinary skill in the art.

DETAILED DESCRIPTION OF THE EMBODIMENTS

In order to better understand the technical solutions of the present disclosure, the embodiments of the present disclosure are described in detail with reference to the accompanying drawings.

Obviously, the described embodiments are only some of rather than all the embodiments of the present disclosure. Based on the described embodiments, all other embodiments obtained by those of ordinary skill in the art without inventive effort shall fall within the scope of the present disclosure.

As described herein, terms used in the embodiments of the present disclosure are intended to describe example embodiments, instead of limiting the present disclosure. The singular forms "a," "an," and "the" used in the embodiments of the present disclosure and the appended claims are intended to include plural forms as well, unless the context clearly indicates otherwise.

It should be understood that the term "and/or" used in this specification is just for relationship description of related objects, indicating that there can be three kinds of relationships. For example, A and/or B, which can mean that A exists alone, A and B exist at the same time, and B exists alone. In addition, the character "I" in this specification generally indicates that the related objects are in an "or" relationship.

It should be understood that although terms first, second, third, etc. may be used to describe terminals in the embodiments of the present disclosure, these terminals should not be limited to these terms. These terms are only used to distinguish terminals from one another. For example, without departing from the scope of the embodiments of the present disclosure, the first terminal may also be referred to as the second terminal, and similarly, the second terminal may also be referred to as the first terminal.

Depending on the context, the word "if" as used herein can be interpreted as "at", or "when", or "in response to determining", or "in response to detecting". Similarly, depending on the context, phrases "if determined" or "if detected (the stated condition or event)" can be interpreted as "when determined", or "in response to determining", or "when detected (the stated condition or event)", or "in response to detecting (the statement or event)".

Figure 1A:
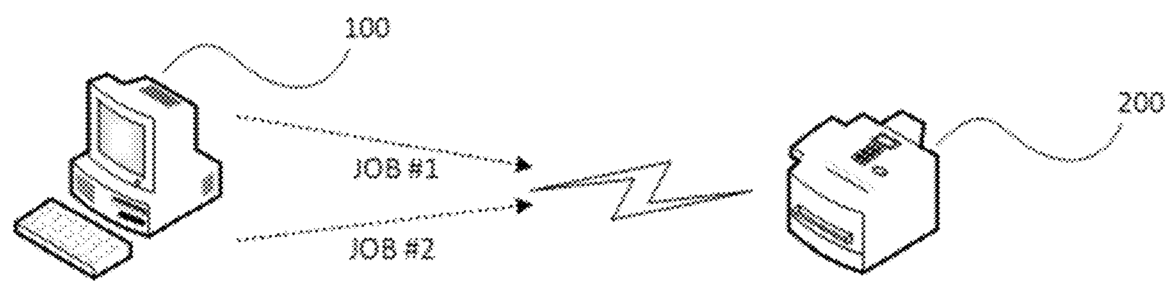
FIGS. 1A and 1B are schematic diagrams showing application environments of the embodiments of the present disclosure.
Figure 1B:
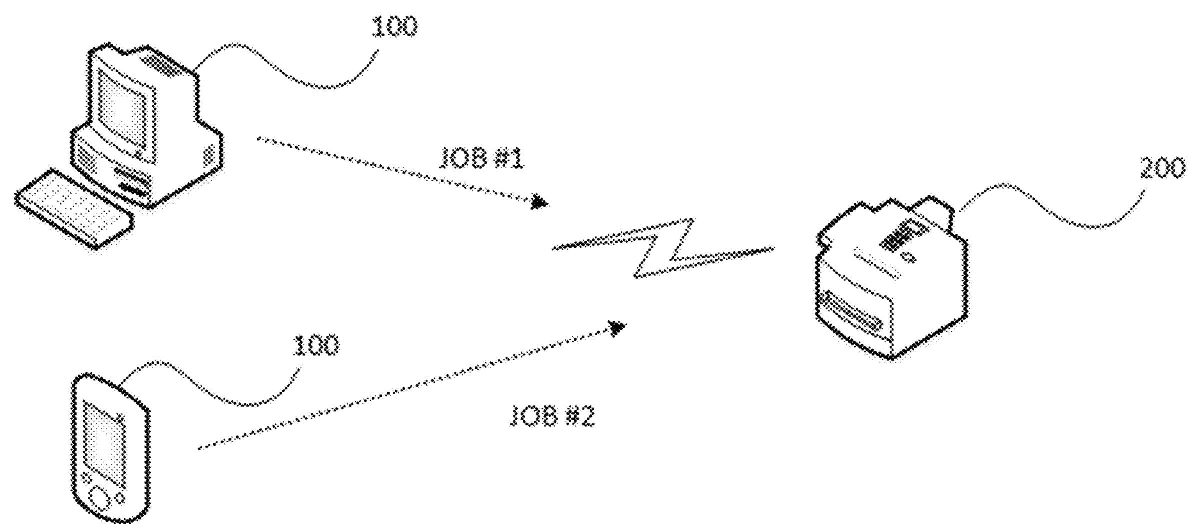

FIGS. 1A and 1B are schematic diagrams showing application environments provided by the embodiments of the present disclosure.

In the embodiments of the present disclosure, a computer 100 and an image-forming device 200 are communicatively connected. The computer 100 sends a first image-forming job identified as "JOB #1" and a second image-forming job identified as "JOB #2" to the image-forming device 200 through communication connection. The image-forming device 200 receives the image-forming jobs, then performs an image-forming operation on an image-forming medium such as paper, and outputs after image-forming is completed for each page. Examples of the computer 100 include, but are not limited to, a desktop computer, a laptop computer, a network computer, a palmtop computer (handheld computer), a personal digital assistant (PDA), an internet-enabled mobile phone, a smart phone, a pager, a digital capture device (e.g., a digital camera and a video camera), an internet device, an e-book, an information board, and a digital or network board. The image-forming device is a device having at least one function related to image-forming, which may include, but is not limited to, an image-forming function, a scan function, a copy function, and a facsimile function, such as a single-function image-forming machine (an image-forming apparatus with image-forming function only), a multi-function image-forming machine (an image-forming apparatus with image-forming, copy, scan, and/or facsimile functions, and with optional setting of number of paper trays), or a digital composite machine (with standard or optional image-forming, scan, and facsimile functions based on the copy function, which uses digital principles to output files in a form of laser image-forming, and can edit images and texts as needed, with a large capacity paper tray, high memory, large hard disk, powerful network support, and multitasking parallel processing capabilities).

In the embodiments of the present disclosure, the computer 100 may be one device or multiple devices. Correspondingly, pending image-forming jobs can be multiple image-forming jobs sent by the same device, multiple image-forming jobs sent by multiple devices, multiple image-forming jobs sent by the same user, or multiple image-forming jobs sent by different users. Illustratively, in FIG. 1A, "JOB #1" and "JOB #2" correspond to two pending image-forming jobs sent by the same user, while in FIG. 1B, "JOB #1" and "JOB #2" correspond to two pending image-forming jobs sent by two users. Generally, the image-forming device 200 processes multiple pending image-forming jobs in a first-in, first-out order.

One aspect of the present disclosure provides a control method for forming an image, which facilitates the user to separate the image-forming medium output for the multiple image-forming jobs.

Figure 1C:
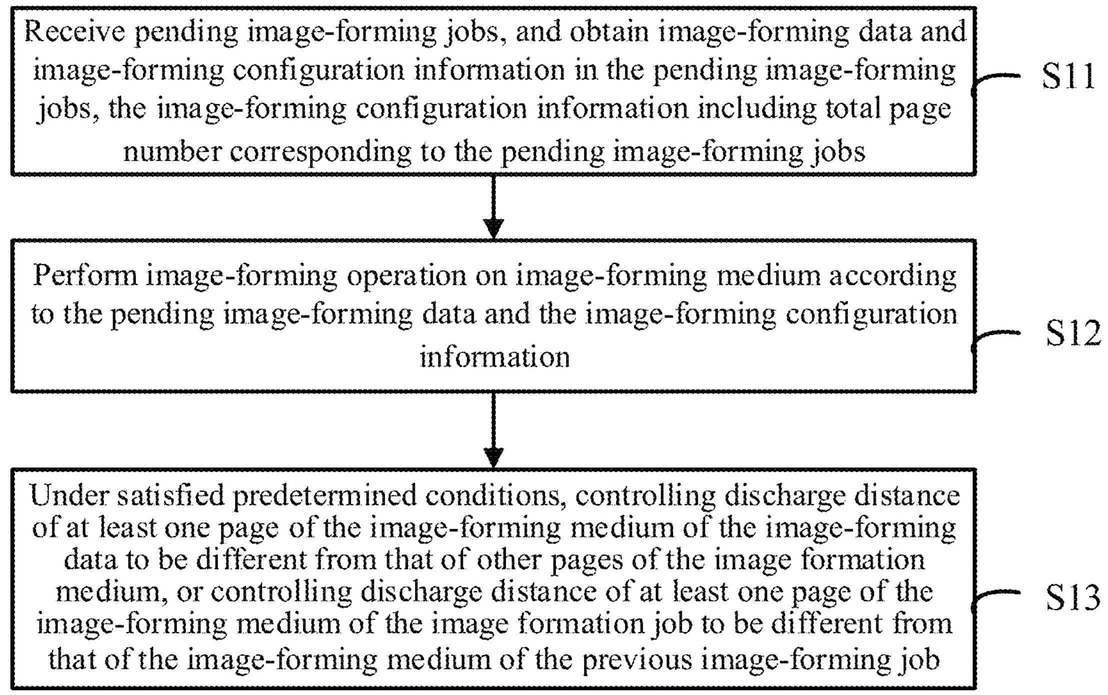
FIG. 1C is a schematic flow chart of a control method for forming an image according to an embodiment of the present disclosure.

As shown in FIG. 1C, the control method for forming an image includes: S11, receiving a pending image-forming job, and obtaining pending image-forming data and image-forming configuration information in the pending image-forming job, the image-forming configuration information including total page number corresponding to the pending image-forming job; S12, performing the image-forming operation on the image-forming medium according to the pending image-forming data and the image-forming configuration information; S13, under satisfied predetermined conditions, controlling discharge distance of at least one page of the image-forming medium of the pending image-forming data to be different from that of other pages of the image-forming medium, or controlling discharge distance of at least one page of the image-forming medium of the pending image-forming job to be different from that of the image-forming medium of a previous image-forming job.

In some embodiments, controlling the discharge distance of at least one page of the image-forming medium of the pending image-forming data to be different from that of other pages of the image-forming medium includes: controlling at least one page of the image-forming medium of the pending image-forming data to be output to a position farther away from or closer to a medium output port of an image-forming device than other pages of the image-forming medium. In other embodiments, controlling the discharge distance of at least one page of the image-forming medium of the pending image-forming job to be different from that of the image-forming medium of the previous image-forming job includes: controlling the image-forming medium of the pending image-forming job to be output to a position farther away from or closer to a medium output port of an image-forming device than the image-forming medium of the previous image-forming job.

The discharge distance may be a distance between an output position of an image-forming medium and the image-forming medium output port of the image-forming device. For example, the discharge distance may indicate the output position of the image-forming medium that is farther away from or closer to the image-forming medium output port of the image-forming device.

In the control method for forming an image provided by the present disclosure, the pending image-forming job is received, and the pending image-forming data and the image-forming configuration information therein are obtained; the image-forming operation is performed on the image-forming medium according to the pending image-forming data and the image-forming configuration information; under satisfied predetermined conditions, the discharge distance of at least one page of the image-forming medium of the pending image-forming data is controlled to be different from that of other pages of the image-forming medium, or the discharge distance of at least one page of the image-forming medium of the pending image-forming job is controlled to be different from that of the image-forming medium of the previous image-forming job. In this way, it is convenient for subsequent users to separate the image-forming medium for multiple image-forming jobs, so that separation efficiency and user experience are improved.

In a detailed embodiment of the present disclosure, the above S11-S13 are further described in detail.

S11, receiving a pending image-forming jobs, and obtaining the pending image-forming data and the image-forming configuration information in the pending image-forming job, the image-forming configuration information including the total page number corresponding to the pending image-forming job.

The image-forming device may receive at least one image-forming job sent by at least one computer, process the received image-forming job, perform the image-forming operation on the image-forming medium, and output the image-forming medium with completed image-forming operation. Different pending image-forming jobs have different information, such as different users, terminals, or other identifiers. The information of the pending image-forming job also includes the pending image-forming data and the image-forming configuration information. The pending image-forming data may include data for forming texts or images on the image-forming medium such as paper. The image-forming configuration information includes information such as set paper size, typesetting direction, typesetting method, etc., and also includes the total page number of the image-forming job, which can be represented by N, where N is a positive integer. For multiple image-forming jobs, the total page numbers of each image-forming job may be different, which may be represented by positive integers N1, N2, etc.

S12, performing the image-forming operation on the image-forming medium according to the pending image-forming data and the image-forming configuration information.

After obtaining the pending image-forming data and the image-forming configuration information, the image-forming device can perform the image-forming operation on the image-forming medium such as paper. During an image-forming process, the image-forming device outputs a sheet of medium from a medium output port after image-forming for each page is completed.

S13, under satisfied predetermined conditions, controlling the discharge distance of at least one page of the image-forming medium of the pending image-forming data to be different from that of other pages of the image-forming medium, or controlling the discharge distance of at least one page of the image-forming medium of the pending image-forming job to be different from that of the image-forming medium of the previous image-forming job.

In the control method for forming an image consistent with the present disclosure, it is intended to facilitate separation of multiple image-forming medium, and the method may include multiple implementations. According to different predetermined conditions, the discharge distance of at least one page of the image-forming medium of the pending image-forming data can be controlled to be different from that of other pages of the image-forming medium, or the discharge distance of at least one page of the image-forming medium of the pending image-forming job can be controlled to be different from that of the image-forming medium of the previous image-forming job.

In the embodiments of the present disclosure, the predetermined conditions may include: an image-forming medium discharge tray currently contains the image-forming medium; the image-forming device currently has more than one pending image-forming job; or the image-forming device has currently completed an image-forming job within a predetermined time before performing the pending image-forming job.

When the predetermined condition is that the image-forming medium discharge tray currently contains the image-forming medium, the image-forming device can detect whether the image-forming medium discharge tray contains the image-forming medium through a sensor provided at the image-forming medium discharge tray. When detecting that the image-forming medium discharge tray contains the image-forming medium, the image-forming device needs to output at least one page in the image-forming medium of the subsequent image-forming jobs at a different distance from the image-forming medium on the image-forming medium discharge tray, so as to facilitate separation of the image-forming medium. The image-forming device can query job information of the previous image-forming jobs from image-forming history records, such as image-forming times, image-forming page numbers, output distances corresponding to various image-forming page numbers, etc. The image-forming device may output different distances of the image-forming medium of the subsequent image-forming jobs according to output distance of a previous job. In some embodiments, the discharge distance of at least one page of the image-forming medium of the pending image-forming data can be controlled to be different from that of other pages of the image-forming medium. The at least one page can be all image-forming medium of the pending image-forming job corresponding to the total page number corresponding to the pending image-forming job. The at least one page of the image-forming medium can also be a first or a last page of the pending image-forming job, first or last M (M is a positive integer) pages of the pending image-forming job, or a page number of a preset ratio at the beginning or end of the pending image-forming job. In some other embodiments, the image-forming device may also control the discharge distances of all the image-forming medium of the current pending image-forming job to be different from that of the image-forming medium of the previous image-forming job.

The predetermined condition may also be that the image-forming device currently has more than one pending image-forming job. In some embodiments, the image-forming device may process the received multiple image-forming jobs in a first-in, first-out manner. The image-forming device stores multiple image-forming jobs in a job list, processes the image-forming in sequence, and controls the output distances of the image-forming medium for various pending image-forming jobs, so as to facilitate the separation of the image-forming medium for multiple pending image-forming jobs. The image-forming device can either choose to control at least one page (such as first page, last page, first M pages, last M pages, etc.) of the image-forming medium to output different distances from other pages of the image-forming medium in each image-forming job, or can choose to control the discharge distance of at least one page (such as all pages) of the image-forming medium of the current pending image-forming job to be different from that of the previous image-forming job.

When the predetermined condition is that the image-forming device has currently completed an image-forming job within the predetermined time before performing the pending image-forming job, information of completed image-forming job is still saved in the history records. Image-forming time, image-forming number, output distance of the image-forming medium of the image-forming job corresponding to an image-forming user of the image-forming device are stored in the history records. For example, numbers 1, 2, 3, . . . , or any suitable character can be used to represent data distance of the image-forming medium output by different engine powers in code. The image-forming device may control at least one page of the current pending image-forming job to output different distances from the image-forming medium of the previous image-forming job, so as to facilitate the separation of the image-forming medium of adjacent output image-forming jobs.

Figure 2:
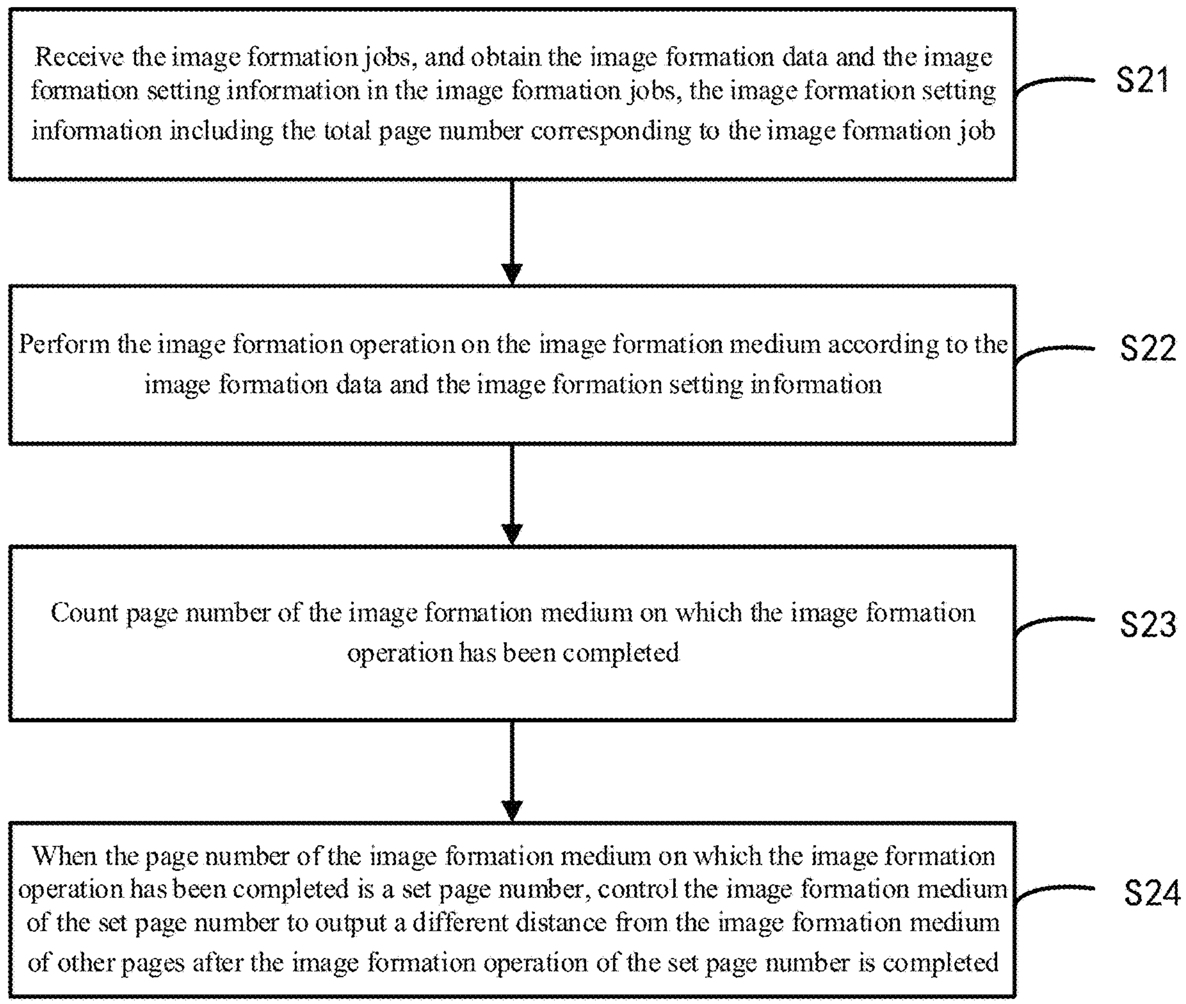
FIG. 2 is a schematic flow chart of a control method for forming an image according to an embodiment of the present disclosure.

Referring to FIG. 2, another control method for forming an image is provided in an embodiment of the present disclosure.

The control method for forming an image includes: S21, receiving a pending image-forming job, and obtaining the pending image-forming data and the image-forming configuration information in the pending image-forming job, the image-forming configuration information including the total page number corresponding to the pending image-forming job; S22, performing the image-forming operation on the image-forming medium according to the pending image-forming data and the image-forming configuration information; S23, counting page number of the image-forming medium on which the image-forming operation has been completed; S24, when the page number of the image-forming medium on which the image-forming operation has been completed is a set page number, controlling the image-forming medium of the set page number to output a different distance from the image-forming medium of other pages after the image-forming operation of the set page number is completed.

In the control method for forming an image provided by the present disclosure, the pending image-forming jobs are received, and the pending image-forming data and the image-forming configuration information therein are obtained; the image-forming operation is performed on the image-forming medium according to the pending image-forming data and the image-forming configuration information; the page number of the image-forming medium on which the image-forming operation has been completed is counted; when the page number of the completed image-forming operation reaches the set page number, controlling the image-forming medium of the set page number to output a different distance from the image-forming medium of other pages after the image-forming operation of the set page number is completed. In this way, it is convenient for the subsequent users to separate the image-forming medium for multiple image-forming jobs, so that the separation efficiency and user experience are improved.

The above S21-S24 are described below in a more detailed embodiment of the present disclosure, to illustrate specific process and advantages thereof.

S21, receiving a pending image-forming job, and obtaining the pending image-forming data and the image-forming configuration information in the pending image-forming job, the image-forming configuration information including the total page number corresponding to the pending image-forming job.

The image-forming device 200 receives the pending image-forming jobs sent by the computer 100, which may be the pending image-forming jobs sent by one device, or the pending image-forming jobs sent by multiple devices. In some embodiments, number of the pending image-forming jobs is two or more. Different pending image-forming jobs have different information, such as different users, terminals, or other identifiers. In the embodiments of the present application, identifiers such as "JOB #1" and "JOB #2" may be used as examples. The information of the pending image-forming jobs also includes the pending image-forming data and the image-forming configuration information. The pending image-forming data may include data for forming texts or images on the image-forming medium such as paper. The image-forming configuration information includes information such as set paper size, typesetting direction, typesetting method, etc., and also includes the total page number of the image-forming jobs, which can be represented by N, where N is a positive integer.

S22, performing the image-forming operation on the image-forming medium according to the pending image-forming data and the image-forming configuration information.

After obtaining the pending image-forming data and the image-forming configuration information, the image-forming device 200 can perform the image-forming operation on the image-forming medium such as paper. During the image-forming process, the image-forming device 200 outputs a sheet of medium from the medium output port after the image-forming for each page is completed.

S23, counting the page number of the image-forming medium on which the image-forming operation has been completed.

The image-forming configuration information of each page also includes an image-forming operation start identifier and an image-forming operation end identifier. When an image engine of the image-forming device 200 detects the image-forming operation end identifier in one page of operation, it can be determined that the image-forming has been completed on current page, and the page number of the image-forming medium on which the image-forming operation has been completed can be incremented by one, so as to realize counting of the page number of the completed operation.

S24, when the page number of the image-forming medium on which the image-forming operation has been completed is the set page number, controlling the image-forming medium of the set page number to output a different distance from the image-forming medium of other pages after the image-forming operation of the set page number is completed.

In the embodiments of the present disclosure, the set page number may be the first page of each image-forming job, or the total page number corresponding to the image-forming job (i.e., the set page number is the last page of the pending image-forming job). The set page number may also be the first M pages or the last M pages of the pending image-forming job, where M is a positive integer and is less than the total page number. The set page number may also be the page number of the preset ratio at the beginning or end of the pending image-forming job, where the preset ratio is greater than 0 and less than 1, such as 5%, and the page number is rounded. As such, when the output distances of the set page number and other pages are different, subsequent separation of the sheets of the multiple image-forming jobs is facilitated.

In the embodiments of the present disclosure, the image-forming medium of other pages may be output at a same distance, referred to as a first distance, and the image-forming medium of the set page number may be output at a second distance different from the first distance. The second distance may be greater than or less than the first distance. In the embodiments of the present disclosure, it is only exemplified that the second distance is greater than the first distance.

In the embodiments of the present disclosure, in order to make the second distance being greater than the first distance, the image-forming medium of the set page number can be controlled to be output to a position farther away from the medium output port of the image-forming device 200 compared with the image-forming medium of other pages. In some embodiments, it can be realized by increasing engine power of a medium output drive in the image-forming device 200.

In some other embodiments, the control method is sensor-based. For example, when the sensor detects that an end of the image-forming medium of a page before the set page number leaves the medium output port, or detects a front of the image-forming medium of the set page number, the image-forming medium of the set page number is controlled to be output to a position farther away from or closer to the medium output port of the image-forming device compared with the image-forming medium of other pages. The control method also includes a time-based control method. For example, at a predetermined time from the image-forming medium of the set page number starts to output (for example, one-third or one-half of the paper is output at the predetermined time), the image-forming medium of the set page number is controlled to be output to a position farther away from the medium output port of the image-forming device compared with the image-forming medium of other pages.

Figure 3A:
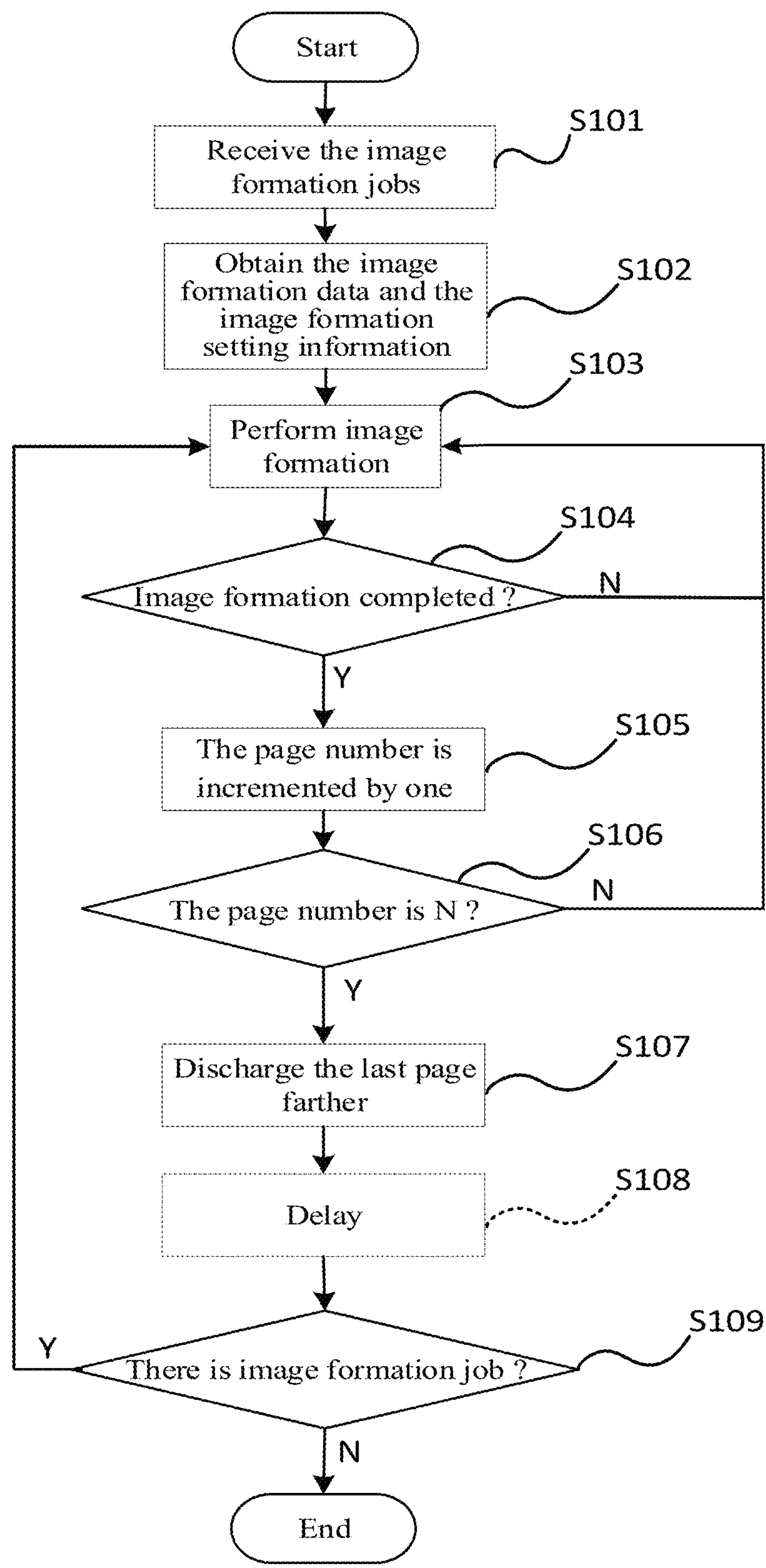
FIG. 3A is a schematic flow chart of another control method for forming an image according to an embodiment of the present disclosure.
Figure 3B:
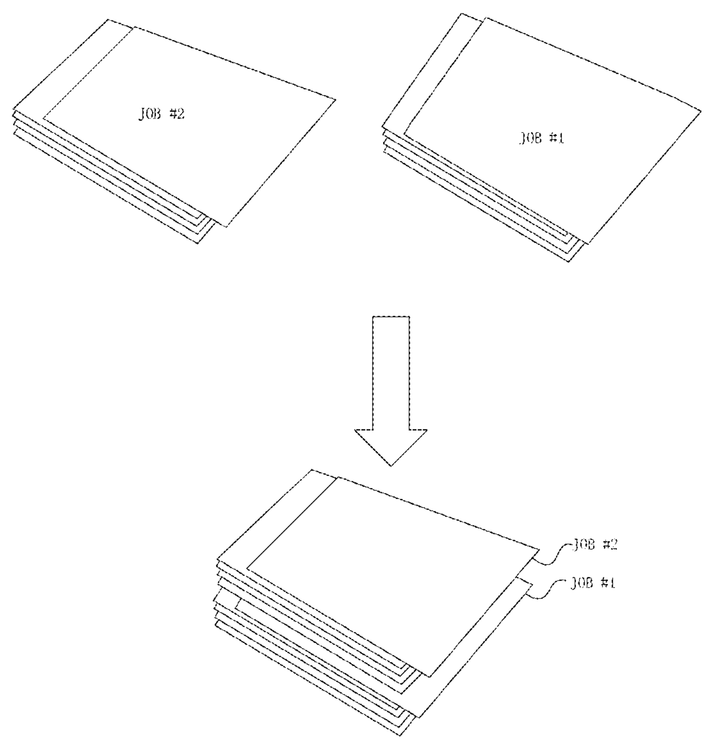
FIG. 3B is a schematic diagram showing an effect after an image-forming in an embodiment of FIG. 3A.

Referring to FIGS. 3A and 3B, another control method for forming an image is provided in an embodiment of the present disclosure, which includes the following processes.

S101, receiving the pending image-forming jobs.

In a connection state between the computer 100 and the image-forming device 200, the computer 100 sends the first image-forming job identified as "JOB #1" and the second image-forming job identified as "JOB #2" to the image-forming device 200. The computer 100 may be two computers sending two identified pending image-forming jobs, or one computer sending two identified pending image-forming jobs.

S102, obtaining the pending image-forming data and the image-forming configuration information.

The image-forming device 200 receives the pending image-forming data and the corresponding image-forming configuration information sent by the computer 100. The image-forming configuration information includes the total page number N.

S103, the image-forming device 200 performs an image-forming processing according to the pending image-forming data and the corresponding image-forming configuration information received from the computer 100.

S104, determining whether the image-forming device has completed the image-forming processing for one page.

In some embodiments, each page of operation data includes the operation start identifier and the operation end identifier. When the image engine detects the operation end identifier in one page of operation, it can be determined that image processing for the current page is completed. If the image-forming device 200 completes the image-forming processing for the entire page, process S105 is performed; otherwise, process S103 is performed again.

S105, when the image-forming device 200 completes the image-forming processing for the entire page, the page number is incremented by one using a counter.

S106, determining whether a count of pages for which image-forming is completed by the counter reaches N based on the image-forming configuration information. If image-forming pages are set to 1-20 in image-forming setting, then N=20. If the count of pages reaches N, process S107 is performed; otherwise, process S103 is performed again.

S107, in a case that the count of pages for which image-forming is completed reaches N, performing an operation of "discharging the last page farther". That is, a paper discharge driving speed is changed (to make it faster than before) to increase the engine power, and the last page is discharged to a position farther away from the medium output port of the image-forming device than other pages. In addition, the sensor can also be used to detect discharge position of the current paper according to the image-forming configuration information. When the sensor detects a front of the Nth page (last page), the paper discharge driving speed is changed (to make it faster than before) to increase the engine power, and the last page is discharged to a position farther away from the medium output port of the image-forming device than other pages. Or when the sensor detects an end of the (N−1)th page (penultimate page), the paper discharge driving speed is changed (to make it faster than before) to increase the engine power, and the last page is discharged to a position farther away from the medium output port of the image-forming device than other pages. A timing device can also be used. When it is timed that the Nth page starts to output, the (N−1)th page is output, or the Nth page is partially discharged (such as one-half of the paper, one-third of the paper, etc.), the paper discharge driving speed is changed (to make it faster than before) to increase the engine power, and the last page is discharged to a position farther away from the medium output port of the image-forming device than other pages.

S108, delay.

S108 is an optional process, i.e., there may or may not be a delay.

S109, determining whether there is a pending image-forming job in an image-forming queue. If yes, process S103 is performed again to continue the image-forming operation; otherwise, the current image-forming is ended.

In an example of the pending image-forming jobs of "JOB #1" and "JOB #2", after the pending image-forming job of "JOB #1" is completed, the pending image-forming job of "JOB #2" continues to be performed until all the pending image-forming jobs are completed.

In the embodiments of the present disclosure, after the image-forming device 200 forms images and outputs consecutive image-forming jobs such as "JOB #1" and "JOB #2", the user can obtain stacked jobs in a paper discharge tray of the image-forming device such as those shown in FIG. 3B. Thus, for consecutive image-forming jobs, the last page of each user or each image-forming job is output farther than other pages, so that the user can easily distinguish the pending image-forming jobs of different users or even distinguish each image-forming job according to distinguished last page. Also, contents such as patterns and texts that the user does not want to form in images are not formed in images and output, so that aesthetics of the pending image-forming jobs is not affected and other materials are not wasted, which saves costs.

Figure 4A:
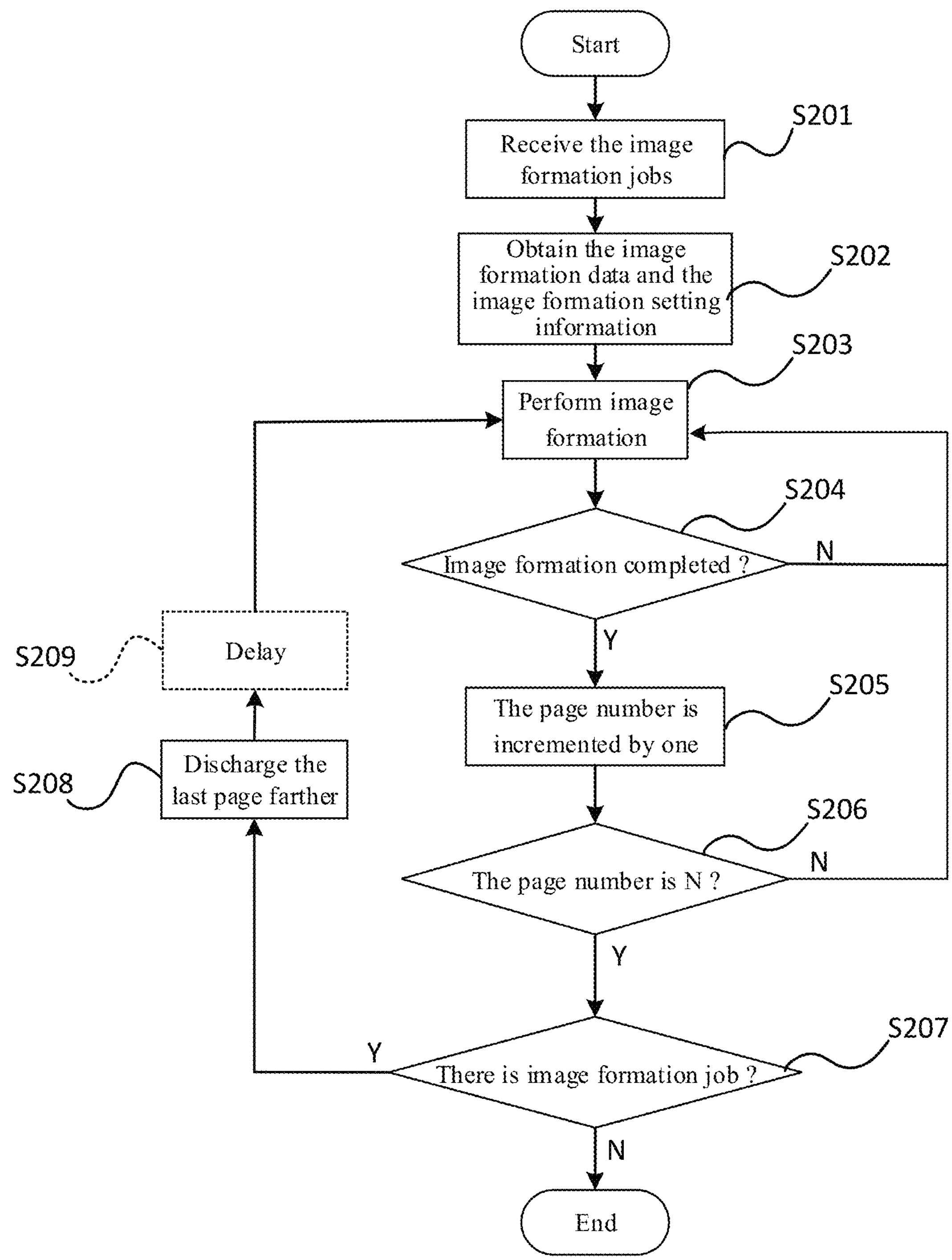
FIG. 4A is a schematic flow chart of another control method for forming an image according to an embodiment of the present disclosure.
Figure 4B:
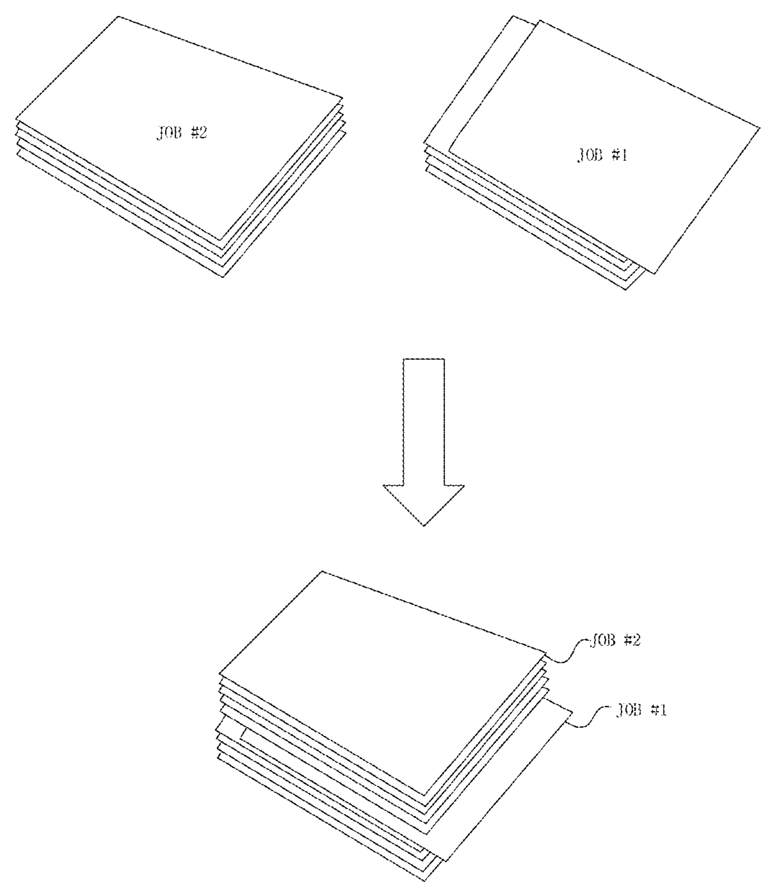
FIG. 4B is a schematic diagram showing an effect after an image-forming in an embodiment of FIG. 4A.

Referring to FIGS. 4A and 4B, another control method for forming an image is provided in an embodiment of the present disclosure, which includes the following processes.

S201, receiving the pending image-forming jobs.

In the connection state between the computer 100 and the image-forming device 200, the computer 100 sends the first image-forming job identified as "JOB #1" and the second image-forming job identified as "JOB #2" to the image-forming device 200. The computer 100 may be two computers sending two identified pending image-forming jobs, or one computer sending two identified pending image-forming jobs.

S202, obtaining the pending image-forming data and the image-forming configuration information.

The image-forming device 200 receives the pending image-forming data and the corresponding image-forming configuration information sent by the computer 100. The image-forming configuration information includes the total page number N.

S203, the image-forming device 200 performs the image-forming processing according to the pending image-forming data and the corresponding image-forming configuration information received from the computer 100.

S204, determining whether the image-forming device has completed the image-forming processing for one page.

In some embodiments, each page of the operation data includes the operation start identifier and the operation end identifier. When the image engine detects the operation end identifier in one page of operation, it can be determined that image processing for the current page is completed. If the image-forming device 200 completes the image-forming processing for the entire page, process S205 is performed; otherwise, process S203 is performed again.

S205, when the image-forming device 200 completes the image-forming processing for the entire page, the page number is incremented by one using the counter.

S206, determining whether the count of pages for which image-forming is completed by the counter reaches N based on the image-forming configuration information. If image-forming pages are set to 1-20 in image-forming setting, then N=20. If the count of pages reaches N, process S207 is performed; otherwise, process S203 is performed again.

S207, determining whether there is a pending image-forming job in the image-forming queue. If yes, process S208 is performed; otherwise, the current image-forming is ended.

S208, when the image-forming device 200 counts to the Nth page, the sensor in the image-forming device 200 detects the front of the Nth page or the end of the (N−1)th page, or the timing device in the image-forming device times that the Nth page starts to output, the (N−1)th page is output, or the Nth page is partially discharged, and it is further determined that there is image-forming job currently, the paper discharge driving speed is changed (to make it faster than before) to increase the engine power, and the last page is discharged to a farther position than other pages.

S209, optionally, there may be a delay. Of course, in some cases, there may not be any delay.

A schematic diagram of an effect after image-forming in the embodiments of the present disclosure is shown in FIG. 4B. The image-forming device 200 receives two consecutive image-forming jobs from the computer 100. After the image-forming operation is completed, the last page of the output image-forming job identified as "JOB #1" is discharged farther, while the last page of the image-forming job identified as "JOB #2" is not subjected to the operation of farther discharge. Therefore, when the user takes all the consecutive image-forming jobs from the paper discharge tray, the last page of the last image-forming job of the multiple consecutive image-forming jobs is not discharged farther, so that aesthetics of the stacked jobs is not affected, and inconvenience for the user to take the stacked jobs due to the last page can be avoided.

Figure 5A:
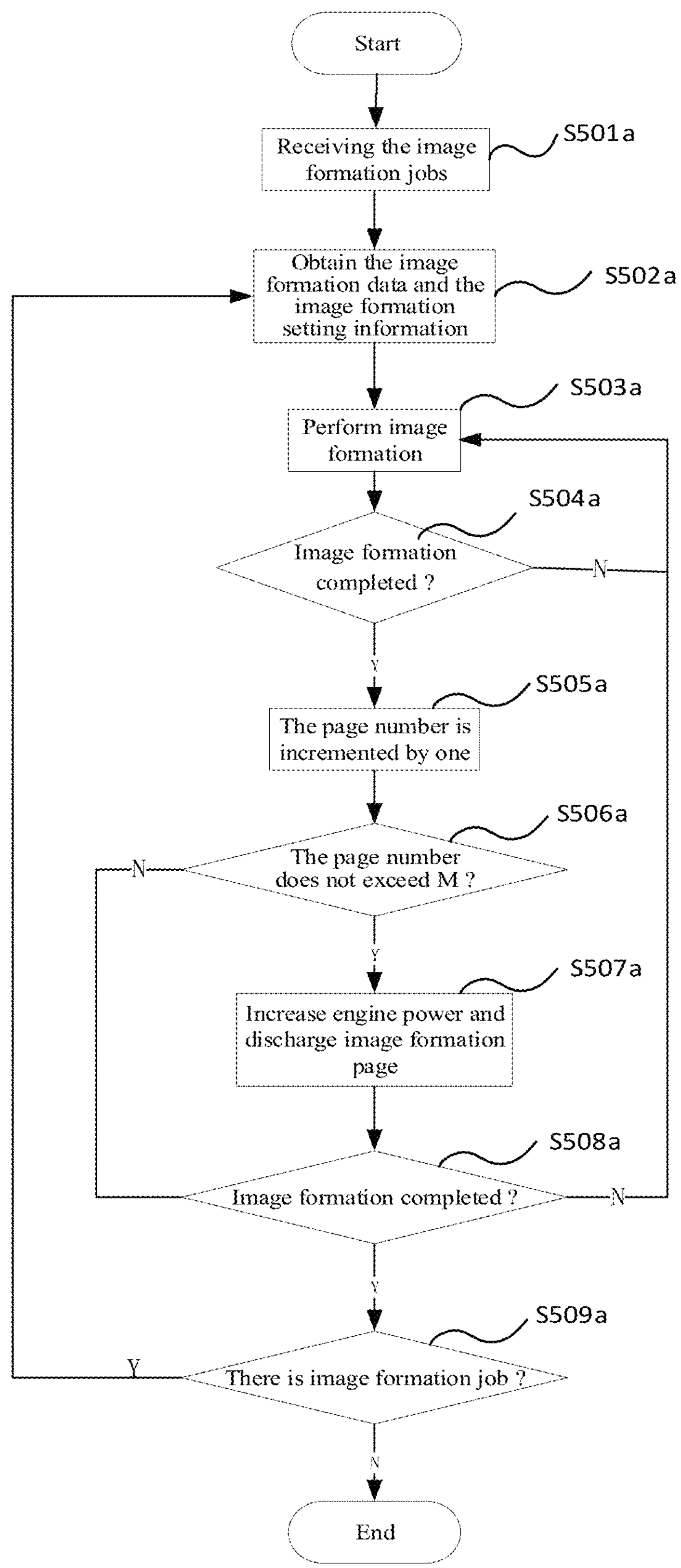
FIG. 5A is a schematic flow chart of another control method for forming an image according to an embodiment of the present disclosure.
Figure 5B:
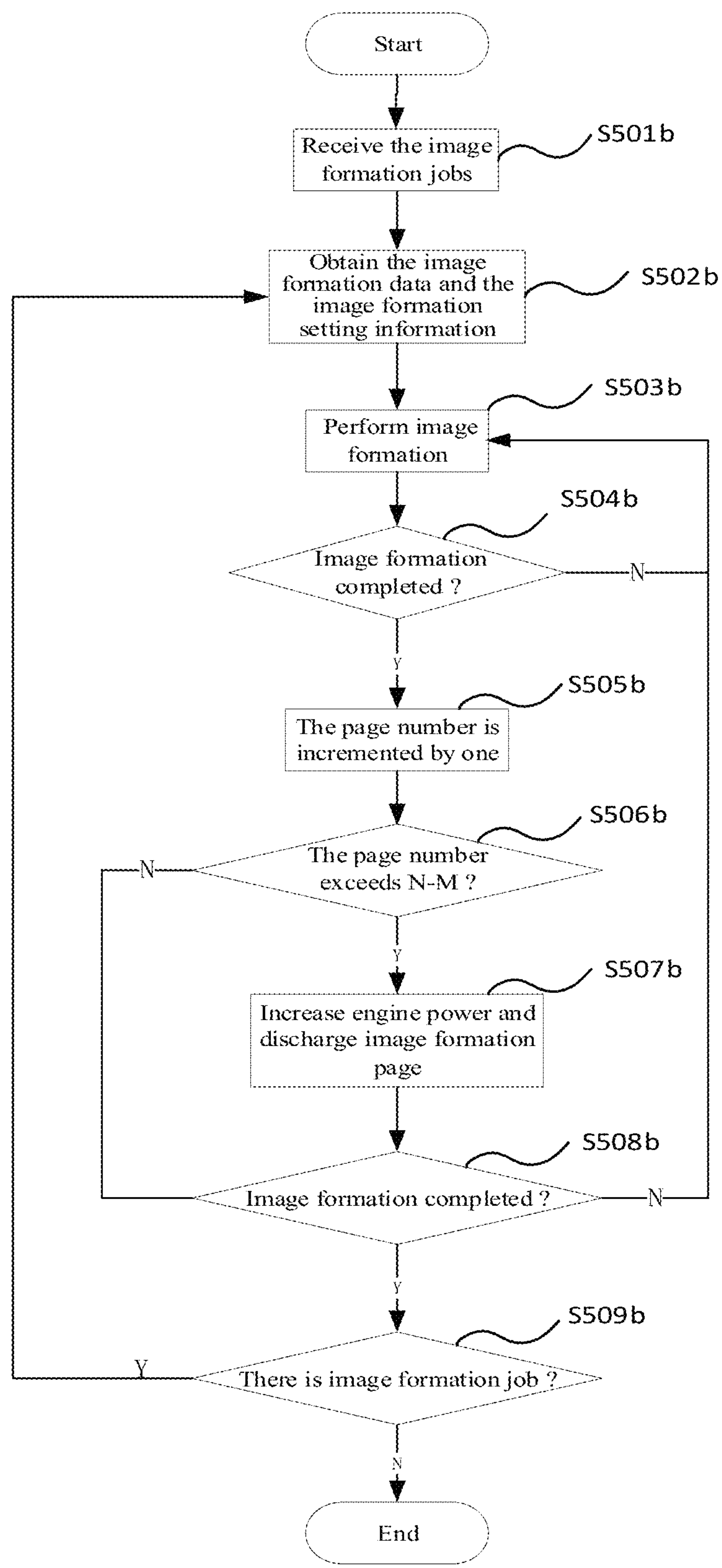
FIG. 5B is a schematic flow chart of another control method for forming an image according to an embodiment of the present disclosure.
Figure 5C:
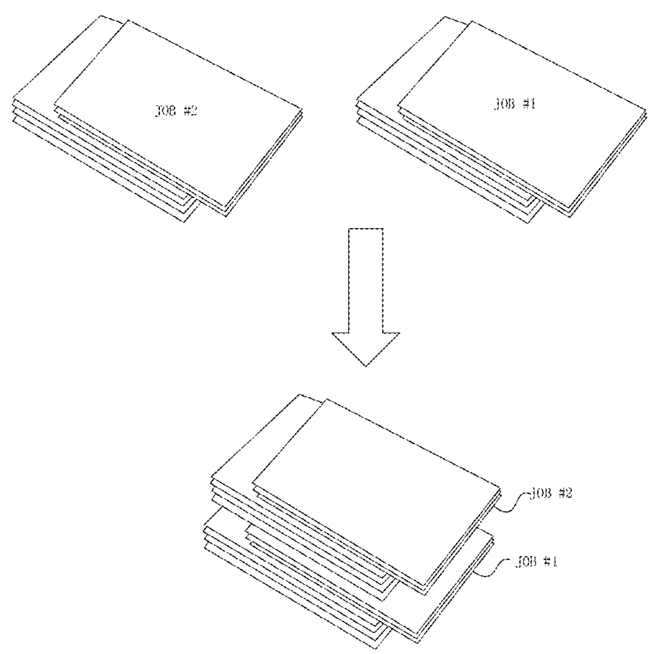
FIG. 5C is a schematic diagram showing an effect after an image-forming in an embodiment of FIG. 5A or 5B.

Referring to FIGS. 5A, 5B, and 5C, another control method for forming an image is provided in an embodiment of the present disclosure.

In the embodiments of FIGS. 5A, 5B, and 5C, the set page number may also be first M pages or last M pages of the image-forming job. For example, in the embodiments of the present disclosure, a total page number of a former image-forming job "JOB #01" is N1, and a total page number of a latter image-forming job "JOB #02" is N2. The first few pages or the last few pages of the image-forming job, such as the first M pages or the last M pages, are output at different distances, where M<N1 and M<N2, so that the user can easily distinguish each image-forming job according to distinguished pages of the image-forming medium.

In some embodiments, as shown in FIG. 5A, the control method for forming an image includes the following processes.

S501*a*, receiving the pending image-forming jobs.

In the connection state between the computer 100 and the image-forming device 200, the computer 100 sends the first image-forming job identified as "JOB #1" and the second image-forming job identified as "JOB #2" to the image-forming device 200. The computer 100 may be two computers sending two identified pending image-forming jobs, or one computer sending two identified pending image-forming jobs.

S502*a*, obtaining the pending image-forming data and the image-forming configuration information.

The image-forming device 200 receives the pending image-forming data and the corresponding image-forming configuration information sent by the computer 100. The image-forming configuration information includes the total page number, where the total page number of the former image-forming job "JOB #01" is N1, and the total page number of the latter image-forming job "JOB #02" is N2.

S503*a*, the image-forming device 200 performs the image-forming processing according to the pending image-forming data and the corresponding image-forming configuration information received from the computer 100.

S504*a*, determining whether the image-forming device has completed the image-forming processing for one page.

In some embodiments, each page of the operation data includes the operation start identifier and the operation end identifier. When the image engine detects the operation end identifier in one page of operation, it can be determined that image processing for the current page is completed. If the image-forming device 200 completes the image-forming processing for the entire page, process S505*a* is performed; otherwise, process S503*a* is performed again.

S505*a*, when the image-forming device 200 completes the image-forming processing for the entire page, the page number is incremented by one using the counter.

S506*a*, determining whether the count of pages for which image-forming is completed by the counter does not exceed M based on the image-forming configuration information. If the count of pages does not exceed M, process S507*a* is performed; otherwise, process S508*a* is performed.

S507*a*, changing the paper discharge driving speed (to make it faster than before) to increase the engine power, and discharging the current page to a farther position than other pages.

S508*a*, determining whether the image-forming device has completed the image-forming processing. If yes, process S509*a* is performed; otherwise, process S503*a* is performed again. In some embodiments, each image-forming job includes a job end mark, and the image-forming device determines completion of the corresponding image-forming job by recognizing the job end mark.

S509*a*, determining whether there is a pending image-forming job in the image-forming queue. If yes, process S502*a* is performed again to obtain pending image-forming data and image-forming configuration information in the pending image-forming job, and continue the image-forming operation; otherwise, the current image-forming is ended.

In some embodiments, as shown in FIG. 5B, the control method for forming an image includes the following processes.

S501*b*, receiving the pending image-forming jobs.

In the connection state between the computer 100 and the image-forming device 200, the computer 100 sends the first image-forming job identified as "JOB #1" and the second image-forming job identified as "JOB #2" to the image-forming device 200. The computer 100 may be two computers sending two identified pending image-forming jobs, or one computer sending two identified pending image-forming jobs.

S502*b*, obtaining the pending image-forming data and the image-forming configuration information.

The image-forming device 200 receives the pending image-forming data and the corresponding image-forming configuration information sent by the computer 100. The image-forming configuration information includes the total page number, where the total page number of the former image-forming job "JOB #01" is N1, and the total page number of the latter image-forming job "JOB #02" is N2.

S503*b*, the image-forming device 200 performs the image-forming processing according to the pending image-forming data and the corresponding image-forming configuration information received from the computer 100.

S504*b*, determining whether the image-forming device has completed the image-forming processing for one page.

In some embodiments, each page of the operation data includes the operation start identifier and the operation end identifier. When the image engine detects the operation end identifier in one page of operation, it can be determined that image processing for the current page is completed. If the image-forming device 200 completes the image-forming processing for the entire page, process S505*b* is performed; otherwise, process S503*b* is performed again.

S505*b*, when the image-forming device 200 completes the image-forming processing for the entire page, the page number is incremented by one using the counter.

S506*b*, determining whether the count of pages for which image-forming is completed by the counter exceeds N-M based on the image-forming configuration information. If the count of pages exceeds N-M, process S507*b* is performed; otherwise, process S508*b* is performed.

S507*b*, changing the paper discharge driving speed (to make it faster than before) to increase the engine power, and discharging the current page to a farther position than other pages.

S508*b*, determining whether the image-forming device has completed the image-forming processing. If yes, process S509*b* is performed; otherwise, process S503*b* is performed again. In some embodiments, each image-forming job includes the job end mark, and the image-forming device determines completion of the corresponding image-forming job by recognizing the job end mark.

S509*b*, determining whether there is a pending image-forming job in the image-forming queue. If yes, process S503*b* is performed again to continue the image-forming operation; otherwise, the current image-forming is ended.

In FIG. 5A, it is realized that the first M pages of the image-forming job are discharged at a further distance, while in FIG. 5B, it is realized that the last M pages of the image-forming job are discharged at a further distance. As for specific effect, reference can be made to FIG. 5C.

In another embodiment of the present disclosure, the image-forming device may also receive at least two pending image-forming jobs and obtain the pending image-forming data and the image-forming configuration information of each pending image-forming job, where the image-forming configuration information includes a job identifier of the pending image-forming job (for example, the job identifier may include information such as a terminal identifier or a user identifier). The image-forming device can perform image-forming operation for each pending image-forming job on the image-forming medium according to the pending image-forming data and the image-forming configuration information, and control the image-forming medium of different pending image-forming jobs to output different distances according to the different job identifiers of different pending image-forming jobs. Thus, in a scenario where the image-forming device consecutively receives multiple image-forming jobs, the image-forming medium of the consecutive jobs can be output at different distances, which facilitates the separation of the image-forming medium for multiple image-forming jobs.

In another embodiment of the present disclosure, the image-forming medium of different image-forming jobs are discharged at different distances. In some embodiments, the image-forming medium of adjacent image-forming jobs are discharged at different distances. For example, the image-forming medium of a former image-forming job may be discharged at a third distance, and that of a latter image-forming job may be discharged at a fourth distance, where the third distance may be greater than or less than the fourth distance.

The control method for forming an image in which the image-forming medium of different image-forming jobs are controlled to be discharged at different distances includes the following processes.

The pending image-forming data and the image-forming configuration information are obtained, where the image-forming configuration information includes the job identifier, and the job identifier may include the user identifier and/or the terminal identifier.

The image-forming starts.

It is determined whether the image-forming job (such as the image-forming job identified as "JOB #01") is completed. If yes, it is further determined whether there is a pending image-forming job (such as the image-forming job identified as "JOB #02"); otherwise, the image-forming processing continues until all the image-forming medium of the image-forming job "JOB #01" are output at the first distance.

In a case where it is determined that the image-forming job "JOB #01" is completed and it is further determined that there is a pending image-forming job "JOB #02", the image-forming device controls to output the pending image-forming job "JOB #02" at the second distance different from the first distance of the image-forming job "JOB #01" until all the image-forming medium of the image-forming job "JOB #02" are output.

Similarly, after all the image-forming medium of the image-forming job "JOB #02" are output, if it is determined that there is a pending image-forming job "JOB #03", the pending image-forming job "JOB #03" is further controlled to output at the first distance different from the second distance of the image-forming medium of the adjacent job "JOB #02", or to output at the third distance different from the second distance of the image-forming medium of the adjacent job "JOB #02". The first distance, the second distance, and the third distance are all different. In this way, in a case where there is a pending image-forming job, the process is repeated until the image-forming medium of all the image-forming jobs are output.

Figure 6:
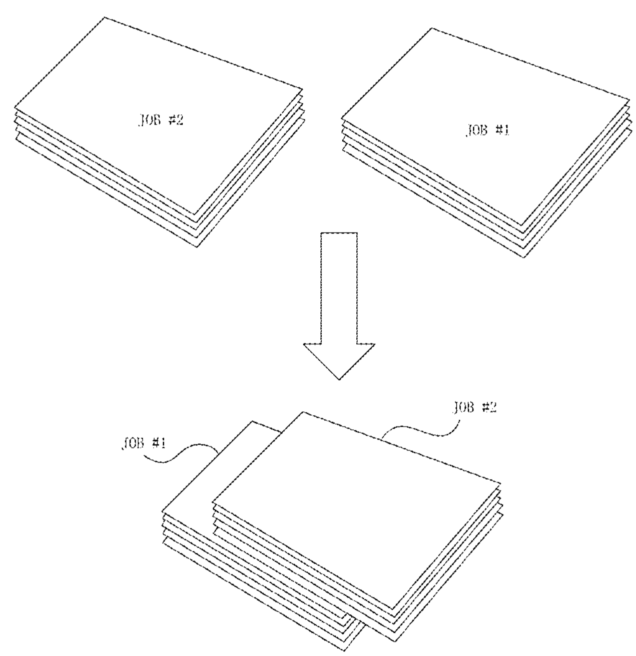
FIG. 6 is a schematic diagram showing an effect of another control method for forming an image according to an embodiment of the present disclosure.

As for an effect of the above embodiments, reference can be made to FIG. 6, which will not be repeated herein.

Another aspect of the present disclosure provides an image-forming apparatus, which may, but is not limited to, be implemented in the image-forming device in a form of software or hardware.

The image-forming apparatus provided by the present disclosure includes a data reception unit, an image-forming unit, and a medium discharge unit.

The data reception unit is configured to receive a pending image-forming job, and obtain the pending image-forming data and the image-forming configuration information in the pending image-forming job, the image-forming configuration information including the total page number corresponding to the pending image-forming job.

The image-forming unit is configured to perform the image-forming operation on the image-forming medium according to the pending image-forming data and the image-forming configuration information.

The medium discharge unit is configured to, under satisfied predetermined conditions, control the discharge distance of at least one page of the image-forming medium of the pending image-forming data to be different from that of other pages of the image-forming medium, or control the discharge distance of at least one page of the image-forming medium of the pending image-forming job to be different from that of the image-forming medium of the previous image-forming job.

The predetermined conditions include at least one of three conditions that the image-forming medium discharge tray currently contains the image-forming medium, the image-forming device currently has more than one pending image-forming job, and the image-forming device has currently completed an image-forming job within the predetermined time before performing the pending image-forming job.

The at least one page of the image-forming medium can be all the image-forming medium corresponding to the total page number corresponding to the pending image-forming job, the first page of the pending image-forming job, or the last page of the pending image-forming job; the at least one page of the image-forming medium can also be the first or last M pages of the pending image-forming job, where M is a positive integer and is less than the total page number; the at least one page of the image-forming medium can also be the page number of the preset ratio at the beginning or end of the pending image-forming job, where the preset ratio is greater than 0 and less than 1.

Figure 7:
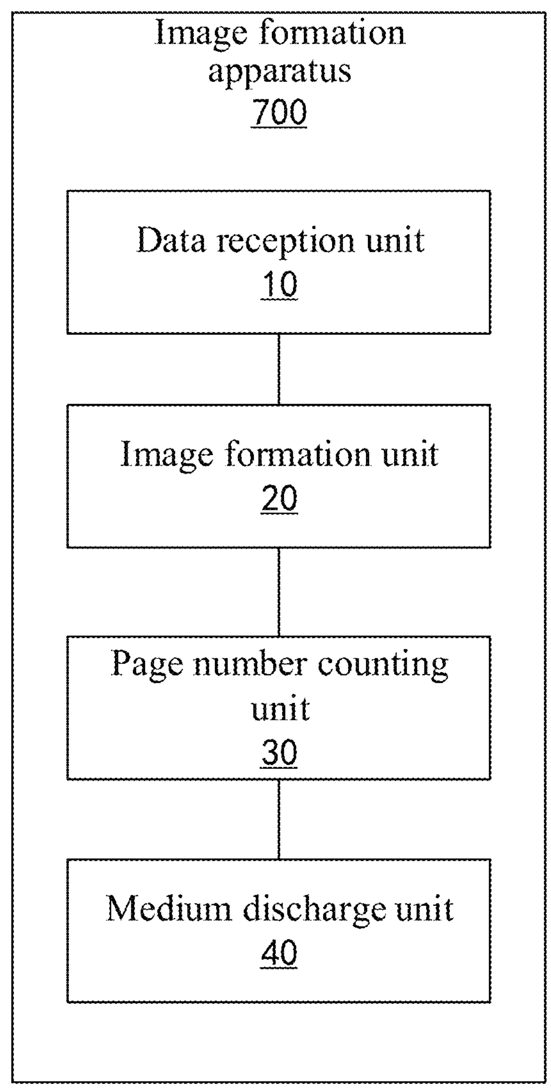
FIG. 7 is a functional block diagram of an image-forming apparatus according to an embodiment of the present disclosure.

As shown in FIG. 7, in a more specific embodiment of the present disclosure, an image-forming apparatus 700 includes a data reception unit 10, an image-forming unit 20, a page number counting unit 30, and a medium discharge unit 40.

The data reception unit 10 is configured to receive a pending image-forming job, and obtain the pending image-forming data and the image-forming configuration information in the pending image-forming job, the image-forming configuration information including the total page number corresponding to the pending image-forming job.

The image-forming unit 20 is configured to perform the image-forming operation on the image-forming medium according to the pending image-forming data and the image-forming configuration information.

The page number counting unit 30 is configured to count the page number of the image-forming medium on which the image-forming operation has been completed.

The medium discharge unit 40 is configured to output the image-forming medium, and when the page number of the image-forming medium on which the image-forming operation has been completed is the set page number, control the image-forming medium of the set page number to output a different distance from the image-forming medium of other pages after the image-forming operation of the set page number is completed.

In a detailed embodiment, implementation of the control method for forming an image by the above-mentioned apparatus will be described.

The data reception unit 10 is configured to receive the pending image-forming jobs, and obtain the pending image-forming data and the image-forming configuration information in the pending image-forming jobs, the image-forming configuration information including the total page number corresponding to the pending image-forming job. The set page number may be the first M pages or the last M pages of the pending image-forming job, where M is a positive integer and is less than the total page number. The set page number may also be the page number of the preset ratio at the beginning or end of the pending image-forming job, where the preset ratio is greater than 0 and less than 1.

The image-forming device 200 receives the pending image-forming jobs sent by the computer 100, which may be the pending image-forming jobs sent by one device, or the pending image-forming jobs sent by multiple devices. In some embodiments, the number of the pending image-forming jobs is two or more. Different pending image-forming jobs have different information, such as different users, terminals, or other identifiers. In the embodiments of the present application, identifiers such as "JOB #1" and "JOB #2" may be used as examples. The information of the pending image-forming jobs also includes the pending image-forming data and the image-forming configuration information. The pending image-forming data may include data for forming texts or images on the image-forming medium such as paper. The image-forming configuration information includes information such as set paper size, typesetting direction, typesetting method, etc., and also includes the total page number of the image-forming jobs, which can be represented by N, where N is a positive integer.

The image-forming unit 20 is configured to perform the image-forming operation on the image-forming medium according to the pending image-forming data and the image-forming configuration information.

After obtaining the pending image-forming data and the image-forming configuration information, the image-forming device 200 can perform the image-forming operation on the image-forming medium such as paper. During the image-forming process, the image-forming device 200 outputs a sheet of medium from the medium output port after the image-forming for each page is completed.

The page number counting unit 30 is configured to count the page number of the image-forming medium on which the image-forming operation has been completed.

The image-forming configuration information of each page also includes the image-forming operation start identifier and the image-forming operation end identifier. When the image engine of the image-forming device 200 detects the image-forming operation end identifier in one page of operation, it can be determined that the image-forming has been completed on the current page, and the page number of the image-forming medium on which the image-forming operation has been completed can be incremented by one, so as to realize the counting of the page number of the completed operation.

The medium discharge unit 40 is configured to output the image-forming medium, and when the page number of the image-forming medium on which the image-forming operation has been completed reaches the set page number, control the image-forming medium of the set page number to output a different distance from the image-forming medium of other pages after the image-forming operation of the set page number is completed.

In the embodiments of the present disclosure, the set page number may be the first page of each image-forming job, or the total page number corresponding to the image-forming job (i.e., the set page number is the last page of the pending image-forming job). As such, when the output distances of the set page number and other pages are different, subsequent separation of the sheets of the multiple image-forming jobs is facilitated.

In the embodiments of the present disclosure, the image-forming medium of other pages may be output at a same distance, referred to as the first distance, and the image-forming medium of the set page number may be output at the second distance different from the first distance. The second distance may be greater than or less than the first distance. In the embodiments of the present disclosure, it is only exemplified that the second distance is greater than the first distance.

In the embodiments of the present disclosure, in order to make the second distance being greater than the first distance, the image-forming medium of the set page number can be controlled to be output to a position farther away from the medium output port of the image-forming device 200 compared with the image-forming medium of other pages. In some embodiments, it can be realized by increasing the engine power of the medium output drive in the image-forming device 200.

In some other embodiments, the control method is sensor-based. For example, when the sensor detects that the end of the image-forming medium of a page before the set page number leaves the medium output port, or detects the front of the image-forming medium of the set page number, the image-forming medium of the set page number is controlled to be output to a position farther away from or closer to the medium output port of the image-forming device compared with the image-forming medium of other pages. The control method also includes the time-based control method. For example, at the predetermined time from the image-forming medium of the set page number starts to output (for example, one-third or one-half of the paper is output at the predetermined time), the image-forming medium of the set page number is controlled to be output to a position farther away from the medium output port of the image-forming device compared with the image-forming medium of other pages.

In the image-forming apparatus provided by the present disclosure, the pending image-forming jobs are received, and the pending image-forming data and the image-forming configuration information therein are obtained; the image-forming operation is performed on the image-forming medium according to the pending image-forming data and the image-forming configuration information; the page number of the image-forming medium on which the image-forming operation has been completed is counted; when the page number of the completed image-forming operation reaches the set page number, controlling the image-forming medium of the set page number to output a different distance from the image-forming medium of other pages after the image-forming operation of the set page number is completed. In this way, it is convenient for the subsequent users to separate the image-forming medium for multiple image-forming jobs, so that the separation efficiency and user experience are improved.

The present disclosure also provides another image-forming apparatus, which includes the data reception unit, a job identification unit, the image-forming unit, and the medium discharge unit.

The data reception unit is configured to receive at least two pending image-forming jobs.

The job identification unit is configured to obtain the pending image-forming data and the image-forming configuration information in each pending image-forming job, where the image-forming configuration information includes the job identifier corresponding to the pending image-forming job.

The image-forming unit is configured to perform the image-forming operation for each pending image-forming job on the image-forming medium according to the pending image-forming data and the image-forming configuration information.

The medium discharge unit is configured to control the image-forming medium of adjacent image-forming jobs with different job identifiers to output different distances.

The above apparatus can realize the discharge of the image-forming medium for different image-forming jobs at different distances, and specific principle thereof will not be repeated herein.

Another aspect of the present disclosure provides an image-forming device which includes the above image-forming apparatus.

Another aspect of the present disclosure provides a computer readable storage medium which includes a stored program. When the program is executed, a device with the storage medium is controlled to execute the control method for forming an image in the foregoing embodiments.

Figure 8:
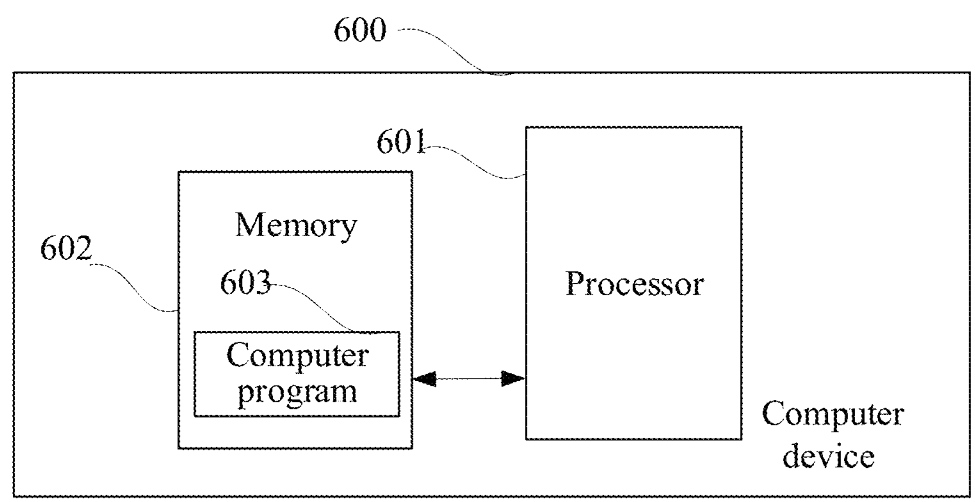
FIG. 8 is a functional block diagram of a computer device according to an embodiment of the present disclosure.

Another aspect of the present disclosure provides a computer device, and FIG. 8 is a schematic diagram of the computer device provided in the embodiments of the present disclosure. As shown in FIG. 8, a computer device 600 includes a processor 601, a memory 602, and a computer program 603 stored in the memory and executable in the processor 601. The control method for forming an image consistent with the present disclosure can be implemented when the processor 601 executes the computer program 603, which will not be described in detail herein to avoid repetition. Functions of various modules/units in the image-forming apparatus consistent with the present disclosure can also be implemented when the computer program is executed by the processor 601, which will not be described in detail herein to avoid repetition.

The computer device 600 may be a desktop computer, a notebook, a palmtop computer, a cloud server, an image-forming device, or another computing device. The computer device may include, but is not limited to, the processor 601 and the memory 602. Those skilled in the art can understand that FIG. 6 only shows an example of the computer device 600, and does not constitute a limitation to the computer device 600, which may include more or less components than the one shown, combination of some components, or different components. For example, the computer device may also include input and output devices, network access devices, buses, etc.

The processor 601 may be a central processing unit (CPU), and may also be another general-purpose processor, a digital signal processor (DSP), an application specific integrated circuit (ASIC), a field-programmable gate array (FPGA), another programmable logic device, a discrete gate, a transistor logic device, a discrete hardware component, etc. The general-purpose processor may be a microprocessor or any conventional processor.

The memory 602 may be an internal storage unit of the computer device 600, such as a hard disk or a memory of the computer device 600. The memory 602 may also be an external storage device of the computer device 600, such as a pluggable hard disk, a smart media card (SMC), a secure digital (SD) card, a flash card, etc. equipped at the computer device 600. Further, the memory 602 may also include both the internal storage unit and the external storage device of the computer device 600. The memory 602 is configured to store computer programs and other programs and data required by the computer device. The memory 602 may also be configured to temporarily store data that has been or will be output.

Those skilled in the art can clearly understand that, as for specific working process of the system, device, and unit described above, reference can be made to the corresponding process of the foregoing method consistent with the present disclosure, which will not be repeated herein for convenience and brevity of description.

In the embodiments of the present disclosure, it should be understood that the disclosed system, apparatus, and method can be implemented in other manners. For example, the example apparatus described above is only illustrative. For example, the division of the units is only a logical function division, and there may be other divisions in actual implementation, e.g., multiple units or components may be combined or integrated into another system, or some features may be omitted or not performed. In addition, the displayed or discussed mutual coupling or direct coupling or communication connection may be through some interfaces, and indirect coupling or communication connection of the apparatus or unit may be in electrical, mechanical, or another form.

The integrated unit implemented in the form of a software functional unit can be stored in a computer readable storage medium. The software functional unit is stored in a storage medium, including several instructions to cause a computer device (such as a personal computer, a server, a network device, etc.) or a processor to execute part of a method consistent with the present disclosure. The storage medium described above can include a USB disk, a mobile hard disk, a read-only memory (ROM), a random access memory (RAM), a magnetic disk, an optical disks, or another medium that can store program codes.

It is intended that the specification and examples be considered as example only and not to limit the present disclosure. Any modification, equivalent replacement, improvement, etc. made within the spirit and principle of the present disclosure shall be within the present disclosure.

What is claimed is:

1. A control method for forming an image comprising:

receiving a pending image-forming job, and obtaining pending image-forming data and image-forming configuration information in the pending image-forming job, the image-forming configuration information including a total page number corresponding to the pending image-forming job;

performing, at an image-forming device, image-forming operation on an image-forming medium according to the pending image-forming data and the image-forming configuration information; and under satisfied predetermined conditions, controlling a discharge distance of at least one page of the image-forming medium of the pending image-forming data to be different from a discharge distance of other pages of the image-forming medium, or controlling a discharge distance of at least one page of the image-forming medium of the pending image-forming job to be different from a discharge distance of the image-forming medium of a previous image-forming job, and the predetermined conditions including:

before starting the pending image-forming job, the image-forming device has completed a preceding image-forming job within a predetermined time.

2. The method of claim 1, wherein:

the at least one page of the image-forming medium is all the image-forming medium corresponding to the total page number corresponding to the pending image-forming job, a first page of the pending image-forming job, or a last page of the pending image-forming job;

the at least one page of the image-forming medium is first or last M pages of the pending image-forming job, M being a positive integer and being less than the total page number; or the at least one page of the image-forming medium is page number of a preset ratio at beginning or end of the pending image-forming job, the preset ratio being greater than 0 and less than 1.

3. The method of claim 1, wherein:

controlling the discharge distance of at least one page of the image-forming medium of the pending image-forming data to be different from that of other pages of the image-forming medium includes controlling at least one page of the image-forming medium of the pending image-forming data to be output to a position farther away from or closer to a medium output port of the image-forming device than other pages of the image-forming medium; or controlling the discharge distance of at least one page of the image-forming medium of the pending image-forming job to be different from that of the image-forming medium of the previous image-forming job includes controlling the image-forming medium of the pending image-forming job to be output to a position farther away from or closer to a medium output port of the image-forming device than the image-forming medium of the previous image-forming job.

4. The method of claim 3, further comprising:

controlling at least one page of the image-forming medium of the pending image-forming data to be output to a position farther away from or closer to the medium output port of the image-forming device than other pages of the image-forming medium by increasing or decreasing engine power of a medium output drive in the image-forming device; or controlling the image-forming medium of the pending image-forming job to be output to a position farther away from or closer to the medium output port of the image-forming device than the image-forming medium of the previous image-forming job by increasing or decreasing engine power of a medium output drive in the image-forming device.

5. The method of claim 3, further comprising controlling the image-forming medium with different discharge distance to be output to a position farther away from or closer to the medium output port of the image-forming device than other pages of the image-forming medium after it is detected that an end of a previous page of the image-forming medium with different discharge distance leaves the medium output port, when a front of the image-forming medium with different discharge distance is detected, at a predetermined time after the image-forming medium with different discharge distance starts to output, or at a predetermined time after an end of a previous page of the image-forming medium with different discharge distance leaves the medium output port.

6. An image-forming device comprising:

a memory containing a computer program for performing a control method for forming an image; and a processor coupled to the memory and, when the computer program is being executed, configured to:

receive a pending image-forming job, and obtain pending image-forming data and image-forming configuration information in the pending image-forming job, the image-forming configuration information including a total page number corresponding to the pending image-forming job;

perform image-forming operation on an image-forming medium according to the pending image-forming data and the image-forming configuration information; and under satisfied predetermined conditions, control a discharge distance of at least one page of the image-forming medium of the pending image-forming data to be different from a discharge distance of other pages of the image-forming medium, or control a discharge distance of at least one page of the image-forming medium of the pending image-forming job to be different from a discharge distance of the image-forming medium of a previous image-forming job, including:

counting a page number of the image-forming medium on which the image-forming operation has been completed; and when the page number of the image-forming medium on which the image-forming operation has been completed is a set page number, at a predetermined time after the image-forming medium of the set page number starts to output to a medium output port of the image forming device, changing a paper discharge driving speed to control the image-forming medium of the set page number to be output to a discharge distance different from a discharge distance of other pages in the medium output port.

7. The image-forming device of claim 6, wherein:

the at least one page of the image-forming medium is all the image-forming medium corresponding to the total page number corresponding to the pending image-forming job, a first page of the pending image-forming job, or a last page of the pending image-forming job;

the at least one page of the image-forming medium is first or last M pages of the pending image-forming job, M being a positive integer and being less than the total page number; or the at least one page of the image-forming medium is page number of a preset ratio at beginning or end of the pending image-forming job, the preset ratio being greater than 0 and less than 1.

8. The image-forming device of claim 6, wherein the processor is further configured to control at least one page of the image-forming medium of the pending image-forming data to be output to a position farther away from or closer to a medium output port of an image-forming device than other pages of the image-forming medium, or control the image-forming medium of the pending image-forming job to be output to a position farther away from or closer to the medium output port of an image-forming device than the image-forming medium of the previous image-forming job.

9. The image-forming device of claim 7, wherein the processor is further configured to control at least one page of the image-forming medium of the pending image-forming data to be output to a position farther away from or closer to a medium output port of an image-forming device than other pages of the image-forming medium by increasing or decreasing engine power of a medium output drive in the image-forming device, or control the image-forming medium of the pending image-forming job to be output to a position farther away from or closer to a medium output port of an image-forming device than the image-forming medium of the previous image-forming job increasing or decreasing engine power of a medium output drive in the image-forming device.

10. The image-forming device of claim 7, wherein the processor is further configured to control the image-forming medium with different discharge distance to be output to a position farther away from or closer to the medium output port of the image-forming device than other pages of the image-forming medium after it is detected that an end of a previous page of the image-forming medium with different discharge distance leaves the medium output port, when a front of the image-forming medium with different discharge distance is detected, at a predetermined time after the image-forming medium with different discharge distance starts to output, or at a predetermined time after an end of a previous page of the image-forming medium with different discharge distance leaves the medium output port.

11. A non-transitory computer readable storage medium comprising:

a stored program that, when being executed, controls a device installed with the storage medium to perform a control method for forming an image, the method including:

receiving a pending image-forming job, and obtaining pending image-forming data and image-forming configuration information in the pending image-forming job, the image-forming configuration information including a total page number corresponding to the pending image-forming job;

performing image-forming operation on an image-forming medium according to the pending image-forming data and the image-forming configuration information; and under satisfied predetermined conditions, controlling a discharge distance of at least one page of the image-forming medium of the pending image-forming data to be different from a discharge distance of other pages of the image-forming medium, or controlling a discharge distance of at least one page of the image-forming medium of the pending image-forming job to be different from a discharge distance of the image-forming medium of a previous image-forming job;

wherein:

the at least one page of the image-forming medium is a page number of a preset ratio at beginning or end of the pending image-forming job, the preset ratio being greater than 0 and less than 1, and the at least one page being greater than one page; and the predetermined conditions including:

before starting the pending image-forming job, the image-forming device has completed a preceding image-forming job within a predetermined time.

* * * * *